United States Patent
Ziegler

(10) Patent No.: US 9,729,397 B2
(45) Date of Patent: *Aug. 8, 2017

(54) DECISION SERVICE MANAGER

(71) Applicant: SAP SE, Walldorf (DE)

(72) Inventor: Carsten Ziegler, Walldorf (DE)

(73) Assignee: SAP SE, Walldorf (DE)

( * ) Notice: Subject to any disclaimer, the term of this patent is extended or adjusted under 35 U.S.C. 154(b) by 71 days.

This patent is subject to a terminal disclaimer.

(21) Appl. No.: 14/976,784

(22) Filed: Dec. 21, 2015

(65) Prior Publication Data

US 2016/0112266 A1   Apr. 21, 2016
US 2017/0093627 A9   Mar. 30, 2017

Related U.S. Application Data

(63) Continuation of application No. 14/455,682, filed on Aug. 8, 2014, now Pat. No. 9,256,400, which is a continuation of application No. 13/477,526, filed on May 22, 2012, now Pat. No. 8,832,018.

(51) Int. Cl.
G06F 17/00      (2006.01)
G06N 5/00       (2006.01)
H04L 12/24      (2006.01)
H04L 29/08      (2006.01)

(52) U.S. Cl.
CPC .......... H04L 41/0816 (2013.01); H04L 67/16 (2013.01)

(58) Field of Classification Search
USPC ......................................................... 706/45
See application file for complete search history.

(56) References Cited

U.S. PATENT DOCUMENTS

| | | |
|---|---|---|
| 7,350,033 B2 | 3/2008 | Hofmann et al. |
| 7,475,088 B2 | 1/2009 | Ziegler |
| 7,702,696 B2 | 4/2010 | Ziegler |
| 7,774,319 B2 | 8/2010 | Schweigkoffer et al. |
| 7,797,708 B2 | 9/2010 | Weber et al. |
| 7,931,354 B2 | 4/2011 | Imai |
| 7,937,354 B2 | 5/2011 | Brelage et al. |
| 7,962,436 B2 | 6/2011 | Brelage et al. |
| 8,020,051 B2 | 9/2011 | Ziegler et al. |

(Continued)

OTHER PUBLICATIONS

Cloud readiness assessment framework and recommendation system Fasil Alemeye; Fekade Getahun AFRICON 2015 Year: 2015 pp. 1-5, DOI: 10.1109/AFRCON.2015.7331995 IEEE Conference Publications.*

(Continued)

Primary Examiner — Michael B Holmes
(74) Attorney, Agent, or Firm — Fish & Richardson P.C.

(57) ABSTRACT

The disclosure generally describes computer-implemented methods, software, and systems for modeling and deploying decision services. One computer-implemented method includes creating a connection between a decision service manager and a managed system, establishing a signature of a decision service, developing, using at least one computer, the decision service based upon the established signature of the decision service, performing a deployment readiness check, transferring generated code implementing the decision service to the managed system upon a determination that the deployment readiness check was successful, inserting the generated code into the managed system, and retrieving a deployment status from the managed system.

18 Claims, 8 Drawing Sheets

(56) References Cited

U.S. PATENT DOCUMENTS

| | | | |
|---|---|---|---|
| 8,108,331 B2 | 1/2012 | Ziegler et al. | |
| 8,196,126 B2 | 6/2012 | Ziegler | |
| 8,433,664 B2* | 4/2013 | Ziegler | G06Q 10/06 706/15 |
| 8,448,194 B2* | 5/2013 | Ziegler | G06F 9/4425 717/100 |
| 8,601,490 B2* | 12/2013 | Sureshan | G06Q 10/067 717/101 |
| 8,626,543 B2* | 1/2014 | Liu | G06Q 10/0633 705/7.11 |
| 8,630,969 B2* | 1/2014 | Ziegler | G06Q 10/06 706/47 |
| 8,712,990 B2* | 4/2014 | Ziegler | G06Q 10/10 707/707 |
| 8,832,018 B2* | 9/2014 | Ziegler | H04L 67/34 706/59 |
| 8,930,960 B2* | 1/2015 | Ziegler | G06F 17/30607 719/310 |
| 8,996,447 B2* | 3/2015 | Ziegler | G06F 21/44 706/59 |
| 9,031,893 B2* | 5/2015 | Ziegler | G06N 5/025 706/47 |
| 9,146,717 B2* | 9/2015 | Ziegler | G06F 8/30 |
| 9,256,400 B2* | 2/2016 | Ziegler | H04L 67/34 |
| 9,489,642 B2* | 11/2016 | Paul | G06Q 10/00 |
| 2011/0282829 A1 | 11/2011 | Rangaswamy et al. | |

OTHER PUBLICATIONS

A secure and lightweight approach for critical data security in cloud Sanchika Gupta; Padam Kumar; Anjali Sardana; Ajith Abraham 2012 Fourth International Conference on Computational Aspects of Social Networks (CASoN) Year: 2012 pp. 315-320, DOI: 10.1109/CASoN.2012.6412421 IEEE Conference Publications.*

A method of automatic assessment of feature compatibility in mobile networks Szymon Fedor; Liam Fallon 2010 Wireless Telecommunications Symposium (WTS) Year: 2010 pp. 1-8, DOI: 10.1109/WTS.2010.5479639 IEEE Conference Publications.*

Automatic analysis of pole mounted auto-recloser data for fault prognosis to mitigate customer supply interruptions Xiaoyu Wang; Scott Strachan; John Kirkwood; Stephen McArthur 2014 49th International Universities Power Engineering Conference (UPEC) Year: 2014 pp. 1-6, DOI: 10.1109/UPEC.2014.6934653 IEEE Conference Publications I.*

A secure and lightweight approach for critical data security in cloud, Gupta, S.; Kumar, P.; Sardana, A.; Abraham, A. Computational Aspects of Social Networks (CASoN), 2012 Fourth International Conference on Year: 2012, pp. 315-320, DOI: 10.1109/CASoN.2012.6412421 Referenced in: IEEE Conference Publications.

About the location of base stations for a UMTS system: Analytical study and simulations Zola, Enrica; Barcelo, Francisco; Communications and Networks, Journal of Year: 2006, vol. 8, Issue: 1; pp. 49-58, DOI: 10.1109/JCN.2006.6182905 Referenced in: IEEE Journals & Magazines.

Traineeships—continuous learning and training in a work context Raminhos, F.M.M.; Travassos Valdez, M.M.; Machado Ferreira, C.; Maciel Barbosa, F.P. EAEEIE (EAEEIE), 2014 25th Annual Conference Year: 2014; pp. 41-44, DOI: 10.1109/EAEEIE.2014.6879382 Referenced in: IEEE Conference Publications.

DPLWN: A Novel Model for Designing and Implementing Dynamic Business Processes and Process Changes Yin Li; Chuang; Lin; Shanchen Pang; MengChu Zhou Computational Science and Its Applications (ICCSA), 2010 International Conference on Year: 2010 pp. 145-154, DOI: 10.1109/ICCSA.2010.46 Referenced in: IEEE Conference Publications.

* cited by examiner

FIG. 3A

*Decision Service Manager*

Decision Service Manager

[Save] [Cancel] [Overview] [New]

▼ Managed Systems — 302

| System Name | Description | RFC Destination | Created On | Created By |
|---|---|---|---|---|
| ERP_WORL | ERP for Rest of World | YI4_070 | 01/15/2012, 08:05:25 | ZIEGLERCA |
| ERP_BRAZL | ERP in Brazil | YI3_070 | 01/30/2012, 04:58:41 | BAERMI |
| FI_EMEA | Financials in Europe | UIX_080 | 01/25/2012, 05:19:54 | ZIEGLERCA |
| FI_US | Financials in North America | UIZ_080 | 01/03/2012, 11:26:14 | ZIEGLERCA |
| HCM_GLOBAL | HCM Global System | ISP_050 | 01/22/2012, 07:11:24 | BAERMI |

— 304

Details: FI_EMEA, Financials in Europe

[Deployment] [Applications] [Technical Information] — 306

System ID: UIX    Installed Components: XYZ ECC 6.0
Client: 080      Operating System: Linux
User: ZIEGLERCA  Machine Type: UIX_080
                 Database System: MaxDB Deployment Readiness Status: Ready 300a

FIG. 3B

Decision Service Manager

Save  ✕ Cancel   Overview

▼ Managed Systems   📋 New

| System Name | Description | RFC Destination | Created On | Created By |
|---|---|---|---|---|
| ERP_WORL | ERP for Rest of World | YI4_070 | 01/15/2012, 08:05:25 | ZIEGLERCA |
| ERP_BRAZL | ERP in Brazil | YI3_070 | 01/30/2012, 04:58:41 | BAERMI |
| FI_EMEA | Financials in Europe | UIX_080 | 01/25/2012, 05:19:54 | ZIEGLERCA |
| FI_US | Financials in North America | UIZ_080 | 01/03/2012, 11:26:14 | ZIEGLERCA |
| HCM_GLOBAL | HCM Global System | ISP_050 | 01/22/2012, 07:11:24 | BAERMI |

Details: FI_EMEA, Financials in Europe

Deployment | Applications | Technical Information

| Name | Description |
|---|---|
| Application abc | Description for application abc |
| Application bcd | Description for application, text text text text text |
| Application qrs | Description for application, text text text |
| Application xyz | Description for application, text text text text |

Decision Service Manager

Save | Cancel | Overview | New

Managed Systems

| System Name | Description | RFC_Destination | Created On | Created By |
|---|---|---|---|---|
| ERP_WORL | ERP for Rest of World | YI4_070 | 01/15/2012, 08:05:25 | ZIEGLERCA |
| ERP_BRAZL | ERP in Brazil | YI3_070 | 01/30/2012, 04:58:41 | BAERMI |
| FI_EMEA | Financials in Europe | UIX_080 | 01/25/2012, 05:19:54 | ZIEGLERCA |
| FI_US | Financials in North America | UIZ_080 | 01/03/2012, 11:26:14 | ZIEGLERCA |
| HCM_GLOBAL | HCM Global System | ISP_050 | 01/22/2012, 07:11:24 | BAERMI |

Details: FI_EMEA, Financials in Europe

Deployment | Applications | Technical Information

Deploy | Deployment Readiness Check | Generated Classes

| Service | Deployment Timestamp | Source System Information | Valid From | Valid To | Traces | Generation Status | Delete |
|---|---|---|---|---|---|---|---|
| ▼SERV_A (Service A..) | | | | | | | |
| | 01/25/2012, 05:19:54 | QPT (200), ZIEGLERCA | 01/25/2012, 05:19:54 | unlimited | Show(1) | ok | |
| | 01/25/2012, 05:05:11 | QPT (200), ZIEGLERCA | 01/20/2012, 05:19:54 | 01/25/2012, 07:19:54 | Show(1) | Regenerated | |
| | 01/25/2012, 05:01:39 | QPT (200), ZIEGLERCA | 01/15/2012, 05:35:54 | 01/19/2012, 06:11:12 | Show(1) | Regenerated | |
| ▼SERV_B (Service B..) | | | | | | | |
| | 01/25/2012, 05:19:54 | QPT (200), ZIEGLERCA | 01/25/2012, 10:12:34 | unlimited | Show(1) | ok | |
| | 01/25/2012, 05:05:11 | QPT (200), ZIEGLERCA | 01/25/2012, 05:19:54 | 01/25/2012, 08:19:54 | Show(1) | Regenerated | |

300c

302 — Decision Service Manager
304 — Managed Systems
310 — Deployment
312 — Deploy / Service rows

DECISION SERVICE MANAGER

CLAIM OF PRIORITY

This application claims priority under 35 USC §120 to U.S. patent application Ser. No. 14/455,682, filed on Aug. 8, 2014; and also U.S. patent application Ser. No. 13/477,526, filed on May 22, 2012 (now U.S. Pat. No. 8,832,018 issued Sep. 9, 2014), the entire contents of both are hereby incorporated by reference herein.

TECHNICAL FIELD

The present disclosure relates to computer-implemented methods, software, and systems for modeling and deploying decision services.

BACKGROUND

Updates to decision services, e.g., business logic, are typically resisted by organizations due to complexity, high cost, and lack of agility to perform even minor updates to the decision services. These factors are normally affected by the use of a three-system landscape for decision service updating: 1) development; 2) quality assurance; and production; coupled with the use of a change and transport system (CTS) to migrate decision service changes between each system. The CTS normally requires specialized technical personnel to perform the migration of decision service changes between the development, quality assurance, and production systems, therefore excluding business experts. The use of the three-system landscape and need for specialized technical personnel for the CTS increases complexity and cost for the organizations. The CTS also requires a period of downtime during decision service migration where the system is unavailable until the updates are complete. The CTS also normally introduces rigid timeframes that are established between CTS migration events. These downtime periods and fixed timeframes affect the organizations' ability to quickly make changes to a production system and an overall agility to adapt to changing business or other conditions. As a result the organizations often seek alternative solutions to perform decision service updates.

SUMMARY

The present disclosure relates to computer-implemented methods, software, and systems for modeling and deploying decision services. One computer-implemented method includes creating a connection between a decision service manager and a managed system, establishing a signature of a decision service, developing, using at least one computer, the decision service based upon the established signature of the decision service, performing a deployment readiness check, transferring generated code implementing the decision service to the managed system upon a determination that the deployment readiness check was successful, inserting the generated code into the managed system, and retrieving a deployment status from the managed system.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

A second aspect, combinable with the general implementation, further comprising installing a business rule service package on the managed system.

In a third aspect, combinable with any of the previous aspects, the deployment readiness check is based upon criteria associated with the managed system and the developed decision service.

In a fourth aspect, combinable with any of the previous aspects, the criteria associated with the managed system and the developed decision service include at least one of that the definition and implementation of the decision service is free of any error messages, that defined limitations are not used within the decision service, the availability of the managed system, or that the managed system responds with an acknowledgement prior to performing the deployment.

A fifth aspect, combinable with any of the previous aspects, further comprising locking objects associated with the decision service to be deployed and locking the managed system.

In a sixth aspect, combinable with any of the previous aspects, the inserting takes place while another decision service is in use.

In a seventh aspect, combinable with any of the previous aspects, the inserted generated code has an as-of date indicating when the inserted generated code is permitted to execute on the managed system.

An eighth aspect, combinable with any of the previous aspects, further comprising generating a deployment log.

A ninth aspect, combinable with any of the previous aspects, further comprising releasing the locks from objects associated with the decision service to be deployed and the managed system.

The subject matter described in this specification can be implemented in particular implementations so as to realize one or more of the following advantages. First, a decision services manager (DSM) server application can interface with a managed system to allow modeling with a business rules management (BRM) application of a decision service with all relevant data and development artifacts applicable to a business application on the managed system. This interfacing permits a local "feel" to the modeling of the decision service. Second, the modeled decision service is deployed to the managed system where the decision service is inserted into the managed system. The inserted decision service application programming interface may be configured to permit execution of the inserted decision service on the managed system according to an as-of date/time parameter. For example, the as-of date/time parameter may indicate that the inserted decision service may execute immediately or that the inserted decision service may not execute until a future date/time. This local execution ensures higher performance for the decision service execution and protection of critical data by avoiding the introduction of delays and data exposure using a network. Third, computer systems do not need to be tightly coupled which increases overall system landscape robustness in case of a computer system failure. Fourth, a plug-in to interface the DSM application with the managed system consumes very little resources on the managed system and is not disruptive to the operations of the managed system. The plug-in may also be provided for multiple platforms increasing flexibility of the DSM application. Fifth, once a modeled decision service is deployed to a managed system, the DSM application is no longer needed to execute the deployed decision service. This increases robustness of the overall system. Sixth, the DSM application may be used with managed test systems to provide manual or automated test functionality. Seventh, the managed system contains a complete description of the deployed decision service allowing multiple DSM applications interfaced with the managed system to load and maintain the deployed decision service. Eighth, the decision service may be executed on a DSM server for testing purposes. Further, a modeled decision service may be deployed to multiple managed systems at the same time, deployed decision services may have an as-of date indicating when the deployed decision service is permitted to execute, and decision services executing on a managed system can generate execution traces that may be imported into the DSM application for trace visualization or analytics. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3A illustrates an example graphical user interface screenshot from a DSM application showing managed systems available to the DSM application.

FIG. 3B illustrates an example graphical user interface screenshot from a DSM application showing information regarding business applications available on a selected managed system.

FIG. 3C illustrates an example graphical user interface screenshot from a DSM application showing information regarding deployment information of various decision services on a selected managed system.

Like reference numbers and designations in the various drawings indicate like elements.

DETAILED DESCRIPTION

The disclosure generally describes computer-implemented methods, software, and systems for modeling and deploying decision services.

Figure 1:
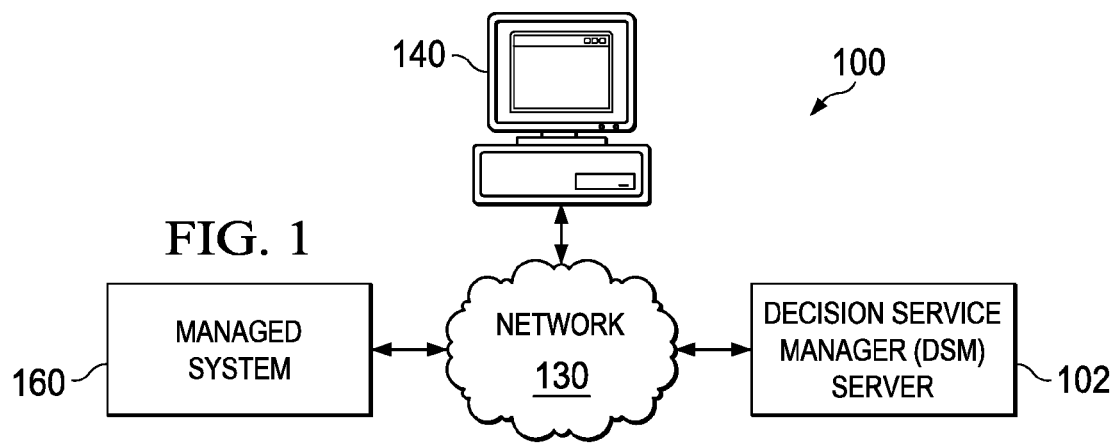
FIG. 1 is a block diagram illustrating an example system for modeling and deploying decision services.

FIG. 1 illustrates an example distributed computing system 100 operable to model and deploy decision services. Specifically, the illustrated example distributed computing system 100 includes or is communicably coupled with a decision service manager (DSM) server 102, a client 140, and a managed system 160 that communicate across a network 130. At a high level, the DSM server 102 allows building, modification, and deployment of decision services to the managed system 160 in an organization's managed system landscape.

Generally, through a graphical user interface (GUI), a DSM server 102 user, for example a client 140, is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Figure 2:
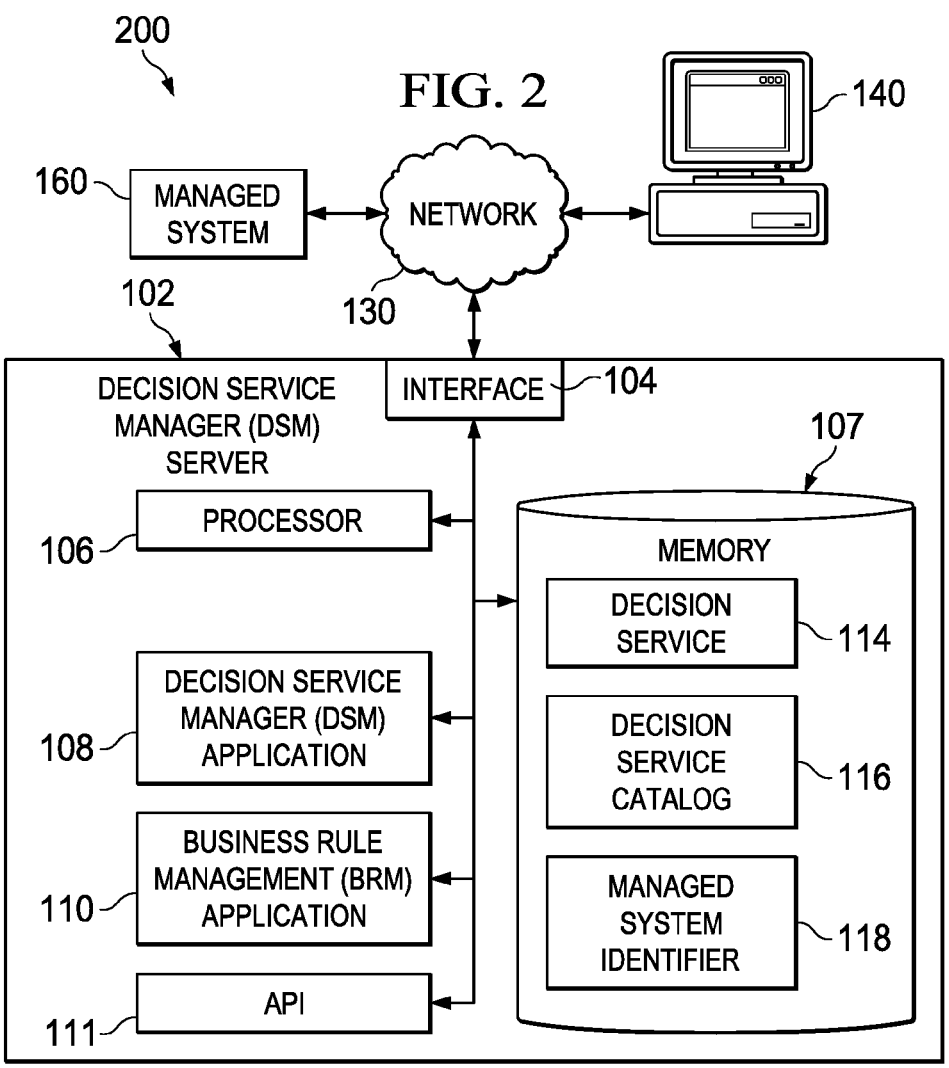
FIG. 2 is a block diagram illustrating a decision service manager (DSM) server.

Turning now to FIG. 2, FIG. 2 is a block diagram 200 illustrating a decision service manager (DSM) server 102. At a high level, the DSM server 102 comprises an electronic computing device operable to receive, transmit, process, store, or manage data and information associated with the example distributed computing system 100. In general, the DSM server 102 is a server that stores a DSM application 108 and a business rule management (BRM) application 110, where at least a portion of the DSM application 108 and/or the BRM application 110 is executed using requests and responses sent to a client 140 within and communicably coupled to the illustrated example distributed computing system 100 using network 130. The DSM application 108 and/or BRM application 110 are used to identify and communicate with one or more managed systems 160 and to build, modify, and deploy decision services to the one or more managed systems 160 in the organization's managed system landscape. In some implementations, the DSM server 102 may store a plurality of various DSM applications 108 and/or BRM applications 110. In other implementations, the DSM server 102 may be a dedicated server meant to store and execute only a single DSM application 108 and/or a BRM application 110. In some implementations, the DSM server 102 may comprise a web server, where the DSM application 108 and/or the BRM application 110 represents one or more web-based applications accessed and executed by the client 140 using the network 130 or directly at the DSM server 102 to perform the programmed tasks or operations of the DSM application 108 and/or the BRM application 110.

Specifically, the DSM server 102 is responsible for receiving application requests, for example decision service modification requests, from one or more client applications associated with the client 140 of the example distributed computing system 100 and responding to the received requests by processing said requests in the associated DSM application 108 and/or BRM application 110, and sending an appropriate response from the DSM application 108 and/or BRM application 110 back to the requesting client application. In addition to requests from the client 140, requests associated with the DSM application 108 and/or BRM application 110 may also be sent from internal users, external or third-party customers, other automated applications, as well as any other appropriate entities, individuals, systems, or computers. According to one implementation, DSM server 102 may also include or be communicably coupled with an e-mail server, a web server, a caching server, a streaming data server, and/or other suitable server. In other implementations, the DSM server 102 and related functionality may be provided in a cloud-computing environment.

The DSM server 102 also includes an interface 104, a processor 106, and a memory 107. The interface 104 is used by the DSM server 102 for communicating with other systems in a distributed environment—including within the example distributed computing system 100—connected to the network 130; for example, the client 140 and the managed system 160, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

As illustrated in FIG. 1, the DSM server 102 includes a processor 106. Although illustrated as a single processor 106 in FIG. 1, two or more processors may be used according to particular needs, desires, or particular implementations of the example distributed computing system 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the DSM server 102. Specifically, the processor 106 executes the functionality required to receive and respond to requests from the client 140 and/or model and deploy decision services.

The DSM server 102 also includes a memory 107, or multiple memories 107. The memory 107 may include any type of memory or database module and may take the form of volatile and/or non-volatile memory including, without limitation, magnetic media, optical media, random access memory (RAM), read-only memory (ROM), removable media, or any other suitable local or remote memory component. The memory 107 may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto associated with the purposes of the DSM server 102. Additionally, the memory 107 may include any other appropriate data, such as VPN applications, firmware logs and policies, firewall policies, a security or access log, print or other reporting files, as well as others. While memory 107 is illustrated as an integral component of the DSM server 102, in alternative implementations, memory 107 can be external to the DSM server 102 and/or the example distributed computing system 100.

The memory 107 holds data for the DSM server 102. In some implementations, the memory 107 includes a decision service 114, a decision service catalog 116, and a managed system identifier 118. Although illustrated as single instances, there may be more than one instance of the decision service 114, the decision service catalog 116, and the managed system identifier 118.

The decision service 114 is one or more of a programmatic task, function, algorithm, instruction, macro, rule set, etc. (i.e. rule) to be executed using a defined set of inputs (the context for the decision service 114) and outputs (the result of the decision service 114). The set of inputs are used by the decision service rule(s) to derive or calculate the values of one or several other attributes. Decision services are often related to validations, derivations, defaulting, classification, calculation, mapping, and Boolean decisions. Often a decision service 114 represents a micro decision, those that occur very frequently and can impact the efficiency of an organization's operations. For example, a decision service 114 may process a received financial data set as inputs, perform a tax calculation for a purchase order associated with a particular country, and then output the result. A decision service is often associated with a particular business process step to perform one or more tasks at the particular business process step. The signature of the decision service may include a description of the decision service including the definition of the inputs and outputs of the decision service. In some implementations, the decision service 114 can be stored within a decision service catalog 116, a collection of decision services 114. In some implementations, the description of a particular decision service 114 is in the form of individual text modules that may be assembled to form a complete description of the particular decision service 114. In some implementations, the decision service catalog 116 can be subdivided into different decision service 114 service types, for example, tax calculators, loan interest calculators, etc.

The BRM application 110 is a decision service 114 development engine providing a comprehensive API and GUI for defining, editing, testing, maintaining, and processing decision services 114 and associated decision services 114 rules. The BRM application 110 allows decision services 114 to be modeled in an intuitive manner, fosters reuse, and supports simulation, tracing, transport, and Extensible Markup Language (XML) export and import of decision services 114. In some implementations, the BRM application 110 is capable of modeling decision service rules that are capable of, for example, using decision tables and trees, reading data during the modeled rule execution, performing database calls/functions, calling services or interfaces in multiple computing languages and/or protocols, and other suitable rule-based functions. For example, a modeled decision service executing on a managed system may perform database updates on a legacy database system using a customer-supplied custom software adaptor to interface the legacy database system with the managed system to transfer the legacy database information to a modern database system. In some implementations, the BRM application 110 is web-based and runs in a client 140 browser window. In some implementations, the BRM application 110 may be partially or completely provided in a cloud-computing environment.

The DSM application 108 provides functionality that is additive to that of the BRM application 110. For example, the DSM application provides a set of capabilities for the administration of managed systems 160, including: 1) decision service deployment into one or multiple managed systems; 2) "as-of" deployment of decision services (i.e., the decision services become active "as-of" a specified time); 3) recovery of system information from managed systems; 4) retention and production of information concerning prior and planned deployments of decision services; 5) importation of saved traces from local execution of decision services on managed systems; 6) importation of XML describing local decision services on managed systems; 7) importation of XML describing business applications available on managed systems; 8) importation and download of generated decision service classes as a file from managed systems; 9) deletion of deployments (prior and planned) in managed systems; 10) deletion of historic decision services (including XML, generated classes, and traces) from managed systems; and 11) performance of deployment tests on managed systems. As will be apparent to those skilled in the art, other appropriate capabilities consistent with these examples may also be provided. In some implementations, the BRM application 110 is modified to tightly integrate with the DSM application 108 in order to provide DSM server 102 users a seamless development environment for decision services 114 and applicable administration of managed systems 160 with respect to the decision services 114.

Remote function call (RFC) is a protocol for remote communication between computers. An RFC destination defines all communication attributes to connect to a remote computer, such as unique computer name, the physical address of the computer, encryption protocols, passwords, etc. In some implementations, the identification of each managed system 160 by the DSM application 108 is provided by an RFC destination (i.e., a managed system identifier 118). For example, a managed system identifier 118 for a particular managed system 160 may be described as: "Name=FI_EMEA, Description=Financials in Europe, RFC_Destination=UIX_080." Of course, as will be appreciated by those skilled in the art, other data fields, values, etc. may be used as long as the managed system can be uniquely identified by the DSM server 102. Turning now to FIG. 3A, FIG. 3A illustrates an example GUI screenshot 300a from the DSM Application 108. Available managed systems to the DSM Application 108 are shown at 302. At 304, the example system described by the example managed system identifier 118 above (i.e., Name=FI_EMEA) is listed as a selected available managed system to the DSM Application 108. Additional technical information is available to the DSM application 108 user for the selected available managed system 304 on a "Technical Information" tab 306. In some implementations of the DSM application 108, attributes of each listed managed system in 304 may be maintained. In other implementations of the DSM application 108, grouping of available managed system, such as in a hierarchical structure, sub-menus, etc., is available. In other implementations, other suitable protocols apart from RFC may be used without departing from the scope of the disclosure.

Turning now to FIG. 3B, FIG. 3B illustrates an example graphical user interface screenshot 300b from a DSM application 108 showing information regarding business applications available on a selected managed system 304. At 308, a list of business applications (described below) available on example selected managed system 304 is shown. While the illustrated example screenshot 300b only shows "Name" and "Description" attributes associated with the listed example applications at 308, other appropriate attributes, such as business application permissions, status, execution time, etc. may also be presented or made available to the DSM application 108 user. In some implementations of the DSM application 108, the manual assignment of some or all business applications available on a managed system is possible.

Turning now to FIG. 3C, FIG. 3C illustrates an example graphical user interface screenshot 300c from a DSM application 108 showing information regarding deployment information of various decision services on a selected managed system 304. At 308, a list of decision services associated with selected managed system 304 are shown. For example, at 310 for decision service "SERV_B", various columns of information 312 are available relating to the decision service 310. Here a DSM application 108 user can obtain historical or planned deployment information such as deployment timestamp, source system information, valid from/valid to information, available trace information, and decision service generation status. At 312, additional commands are available, such as deploy and deployment readiness check. In some implementations of the DSM application 108, the grouping/selection of multiple decision services for deployment to one or more managed systems 160 is possible. It should be appreciated that FIGS. 3A-3C are only representative examples of the GUI interface available through the DSM application 108 and are not meant to limit in any way appropriate functionality or information that may be made available to a DSM application 108 user.

The DSM server 102 further includes an application programming interface (API) 111. The API 111 may include specifications for routines, data structures, and object classes. The API 111 may be either computer language independent or dependent and refer to a complete interface, a single function, or even a set of APIs. In some implementations, the API 111 can be used to interface between the DSM application 108 and/or one or more components of the DSM server 102 or other components of the example distributed computing system 100, both hardware and software. For example, in one implementation, the DSM application 108 can utilize API 111 to communicate with a managed system 160.

Figure 4:
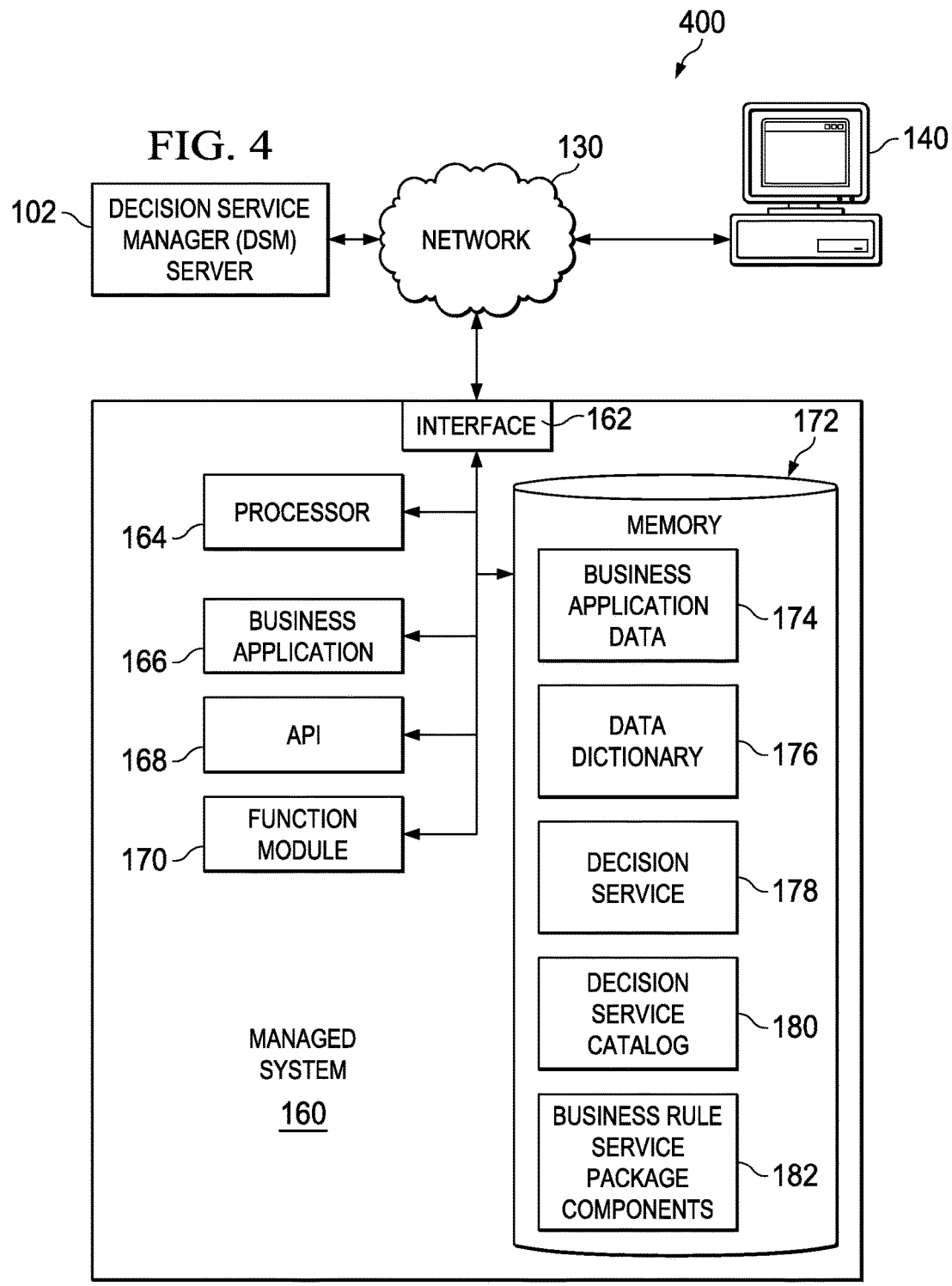
FIG. 4 is a block diagram illustrating a managed system.

Turning now to FIG. 4, FIG. 4 is a block diagram 400 illustrating a managed system 160. The managed system 160 may be any computing device operable to connect to or communicate with the DSM server 102 using the network 130. In general, the managed system 160 comprises an electronic computer device operable to receive, transmit, process, and store any appropriate data associated with the example distributed computing system 100.

Specifically, the managed system 160 acts as a client to a DSM server 102 and receives calls from the DSM server 102. For example, a received call may be for the deployment of a new decision service 114 on the managed system 160. In some implementations, the received call may be a remote function call (RFC), but communication using any suitable interface, protocol or communication method is envisioned, as appropriate, between the DSM server 102 and the managed system 160 without departing from the scope of this disclosure. Example managed systems 160 may include, but are not limited to, enterprise resource planning (ERP) systems and customer relationship management (CRM) systems.

The illustrated managed system 160 includes an interface 162, a processor 164, an API 168, a function module 170, and a memory 174. The interface 162 is used by the managed system 160 for communicating with other systems in a distributed environment—including within the example distributed computing system 100—connected to the network 130; for example, the DSM server 102, as well as other systems communicably coupled to the network 130 (not illustrated). The interface 162 may be consistent with the above-described interface 104 of the DSM server 102 or other interfaces within the example distributed computing system 100. The processor 164 may be consistent with the above-described processor 106 of the DSM server 102 or other processors within the example distributed computing system 100. Specifically, the processor 164 executes instructions and manipulates data to perform the operations of the managed system 160, including the functionality required to receive requests from the DSM server 102, process responses to the DSM server 102, execute the business application, and/or logic associated with the plug-in.

The business application 166 is any type of application that allows the client 140 to request and view content on the client 140. In some implementations, the business application 166 can be and/or include a web browser. In some implementations, the business application 166 can use decision services 114, parameters, metadata, and other information received prior to launch to perform tasks associated with the managed system 160 or other components communicably coupled with managed system 160. Once a particular business application 166 is launched, a client 140 may interactively process a task, event, or other information associated with the managed system 160. The business application 144 can also be any application, program, module, process, or other software that may execute, change, delete, generate, or otherwise manage information associated with a particular managed system 160, and in some cases, a business process performing and executing business process-related events. In particular, business processes communicate with other clients 140, applications, systems, and components to send and receive events. Additionally, a particular business application 166 may operate in response to and in connection with at least one request received from other business applications 166, including a business application 166 associated with another managed system 160. In some implementations, each business application 166 can represent a Web-based application accessed and executed by remote clients 140 using the network 130 (e.g., through the Internet, or using at least one cloud-based service associated with the business application 166). For example, a portion of a particular business application 166 may be a Web service associated with the business application 166 that is remotely called, while another portion of the business application 166 may be an interface object or agent bundled for processing at a remote client 140. Moreover, any or all of a particular business application 166 may be a child or sub-module of another software module or enterprise application (not illustrated) without departing from the scope of this disclosure. Still further, portions of the particular business application 166 may be executed or accessed by a user working directly at the managed system 160, as well as remotely at a corresponding client 140. In some implementations, the DSM server 102 can execute the business application 166. Further, although illustrated as a single business application 166, the business application 166 may be implemented as multiple business applications in the managed system 160.

The managed system 160 further includes an application programming interface (API) 168. The API 168 may be consistent with the above-described API 111 of the DSM server 102 or other API's within the example distributed computing system 100. Specifically, API 168 provides an interface for the remote trigger of an execution of a decision service on the managed system 160 by the DSM server 102, client 140.

The illustrated managed system 160 also includes a memory 172, or multiple memories 172 that may be consistent with the above-described memory 107 of the DSM server 102 or other memories within the example distributed computing system 100 but storing objects and/or data associated with the purposes of the managed system 160. The memory 172 holds data for the managed system 160. In some implementations, the memory 172 includes business application data 174, a data dictionary 176, a decision service 178, a decision service catalog 180, and business rule service package components 182. Although illustrated as single instances, there may be more than one instance of the business application data 174, the data dictionary 176, the decision service 178, the decision service catalog 180, and the business rule service package components 182. The decision service 178 and the decision service catalog 180 associated with memory 172 may be consistent with the above-mentioned descriptions of the decision service 114 and/or the decision service catalog 116 associated with the memory 107 of the DSM server 102. Specifically, the decision service 178 provides decision service functionality to the managed system 160. On the managed system 160, the decision service catalog 180 provides a list of decision services deployed from the DSM server 102 to the managed system 160.

The business application data 174 is any type of data associated with a data object used by a business application. For example, for a business application that processes sales invoices, business application data for a specific sales invoice data object may include data pertaining to a particular sales invoice number, buyer, seller, date, address, product(s), quantity, price, tax rate, etc.

The data dictionary 176 is a central, non-redundant, logical description/definition of all data objects used within the managed system 160. Example data objects stored within the data dictionary 176 includes database tables, views, types, domains, search helps, and lock objects. For example, the data dictionary 176 shows how the data objects are mapped to an underlying relational database in tables or views which store business application data 174. New or modified data objects within the data dictionary 176 are available to all components associated with the managed system 160. The data dictionary 176 also provides standard editing functions for editing data objects within the data dictionary 176.

The business rule service package components 182 are created by the installation of a business rule service package (not illustrated) providing necessary support components to allow a system to act as a managed system 160. In some implementations, an installed business rule service package 180 adds components to the managed system 160 including a function group and a function module 170 for communication with the DSM server 102, database tables for persistence to save, for example, generated class names, traces, and Extensible Markup Language (XML) descriptions of decision services, the API 168 (described above) for decision service invocation by the DSM server 102, and helper classes for use by the function module 170 and the API 168.

The function module 170 interfaces with the business application 166 and/or memory 172 and permits communication between the managed system 160 and the DSM server 102. In some implementations, communication between the managed system 160 and the DSM server 102 occurs only from the DSM 102 to the managed system 160. In other implementations, communication between the managed system 160 and the DSM server 102 may be bi-directional. Through the function module, the DSM server 102 has visibility to business applications 166 and business artifacts stored on memory 172 (e.g., business application data 174, data dictionary 176, etc.). The BRM application 110 may then be used in conjunction with the DSM application 108 to develop and/or maintain decision services associated with the managed system using the actual business artifacts from the managed system 160. For example, a function module 170 may be called by the DSM application 108 to deploy a decision service to the managed system. The function module 170 would receive the decision service description to deploy from the DSM server 102 and insert the decision service code into the managed system 170. In another example, the DSM application 108 uses a function module 170 on the managed system 160 to retrieve data values from the managed system 160 at design time of a decision service. In this example, the value of an Employee data field may be requested by the DSM application 108 from the function module for use in the BRM application 110, The function module 170 would then return the requested Employee data from the managed system 160. In some implementations, the DSM application 108 can retrieve data from multiple managed systems 160.

The helper classes verify and report whether a transferred decision service 114 can be executed on the managed system 160. The helper classes also optimize the transferred decision service 114 when inserted into the managed system 160 as a local decision service 178 and update the decision service catalog 180 to reflect the insertion of the decision service 178.

While the API 168 and the function module 170 are illustrated as separate modules, the above-described function group, database tables, XML, and helper classes are collectively shown within memory 172 as the business rule service package components 180. However, these components could be implemented and/or illustrated as stand-alone modules without departing from the scope of this disclosure. In some implementations, it is possible to install both a DSM application 108 and a business rule service package onto a managed system. In this implementation, the managed system 160 will act as both a server and a client for remote decision service code generation and/or deployment. If a business rule service package and a DSM application are installed on a managed system 160, those skilled in the art will appreciate that various components illustrated in FIG. 2 may also be incorporated into the managed system to support DSM application 108 functionality, for example, the decision service catalog 116 or the managed system identifier 116. In some implementations, the DSM application 108 will verify the availability of the components installed by the business rule service package. In some implementations, this verification can be performed by verifying the actual components installed by the business rule service package and/or through a flag, empty file, registry entry, or other suitable installation indicator.

There may be any number of managed systems 160 associated with, or external to, the example distributed computing system 100. For example, while the illustrated example distributed computing system 100 includes one managed system 160, alternative implementations of the example distributed computing system 100 may include multiple managed systems 160 communicably coupled to the DSM server 102 and/or the network 130, or any other number suitable to the purposes of the example distributed computing system 100. Additionally, there may also be one or more additional managed systems 160 external to the illustrated portion of the example distributed computing system 100 that are capable of interacting with the example distributed computing system 100 using the network 130.

Figure 5:
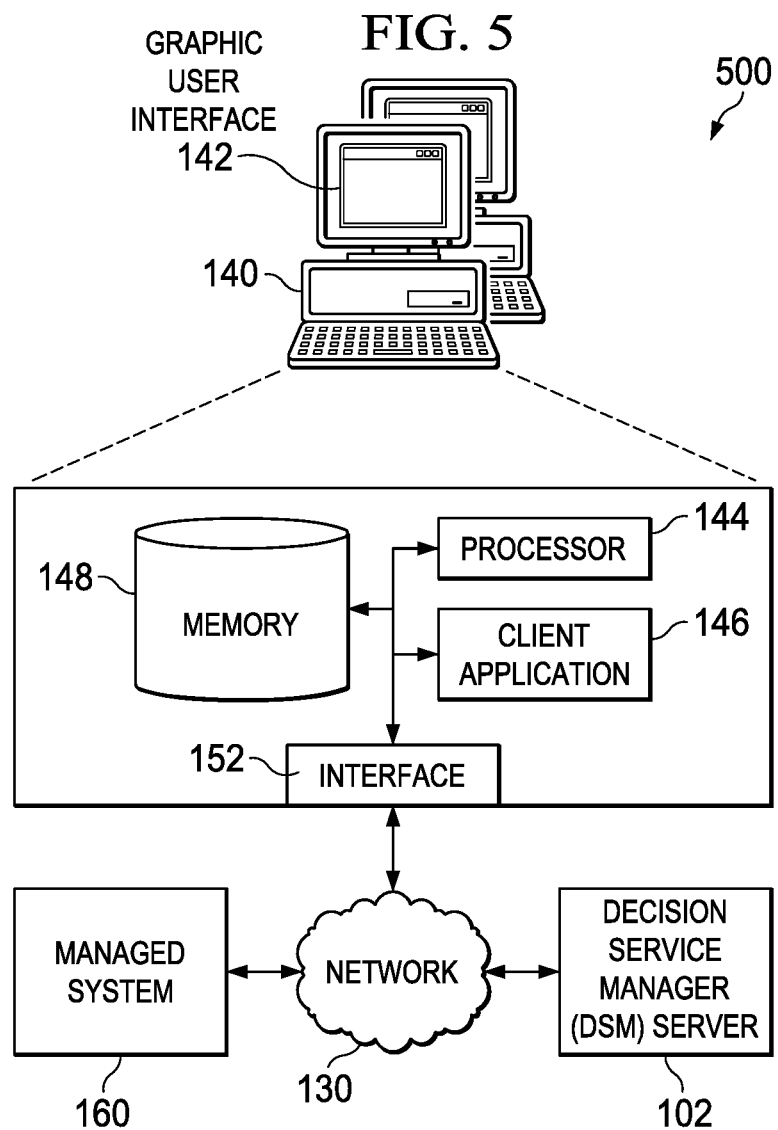
FIG. 5 is a block diagram illustrating a client.

Turning now to FIG. 5, FIG. 5 is a block diagram 500 illustrating a client 140. The client 140 may be any computing device operable to connect to or communicate with at least the DSM server 102 using the network 130. In general, the client 140 comprises an electronic computer device operable to receive, transmit, process, and store any appropriate data associated with the example distributed computing system 100.

The illustrated client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the server 102. Once a particular client application 146 is launched, a user may interactively process a task, event, or other information associated with the business suite server 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the DSM server 102 and/or managed system 160, as well as other systems communicably coupled to the network 130 (not illustrated). The interface 152 may also be consistent with the above-described interface 104 of the DSM server 102, the interface 162 of the managed system 160, or other interfaces within the example distributed computing system 100. The processor 144 may be consistent with the above-described processor 106 of the DSM server 102, the processor 164 of the managed system 160, or other processors within the example distributed computing system 100. Specifically, the processor 144 executes instructions and manipulates data to perform the operations of the client 140, including the functionality required to send requests to the DSM server 102 and/or managed system 160 and to receive and process responses from the DSM server 102 and/or the managed system 160. The memory 148 may be consistent with the above-described memory 107 of the DSM server 102, the memory 172 of managed system 160, or other memories within the example distributed computing system 100 but storing objects and/or data associated with the purposes of the client 140.

Further, the illustrated client 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the DSM server 102 and/or the managed system 160.

There may be any number of clients 140 associated with, or external to, the example distributed computing system 100. For example, while the illustrated example distributed computing system 100 includes one client 140, alternative implementations of the example distributed computing system 100 may include multiple clients 140 communicably coupled to the DSM server 102, managed system 160, and/or the network 130, or any other number suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the DSM server 102, managed system 160, or the client 140 itself, including digital data, visual information, or a GUI 142, as shown with respect to the client 140.

Figure 6:
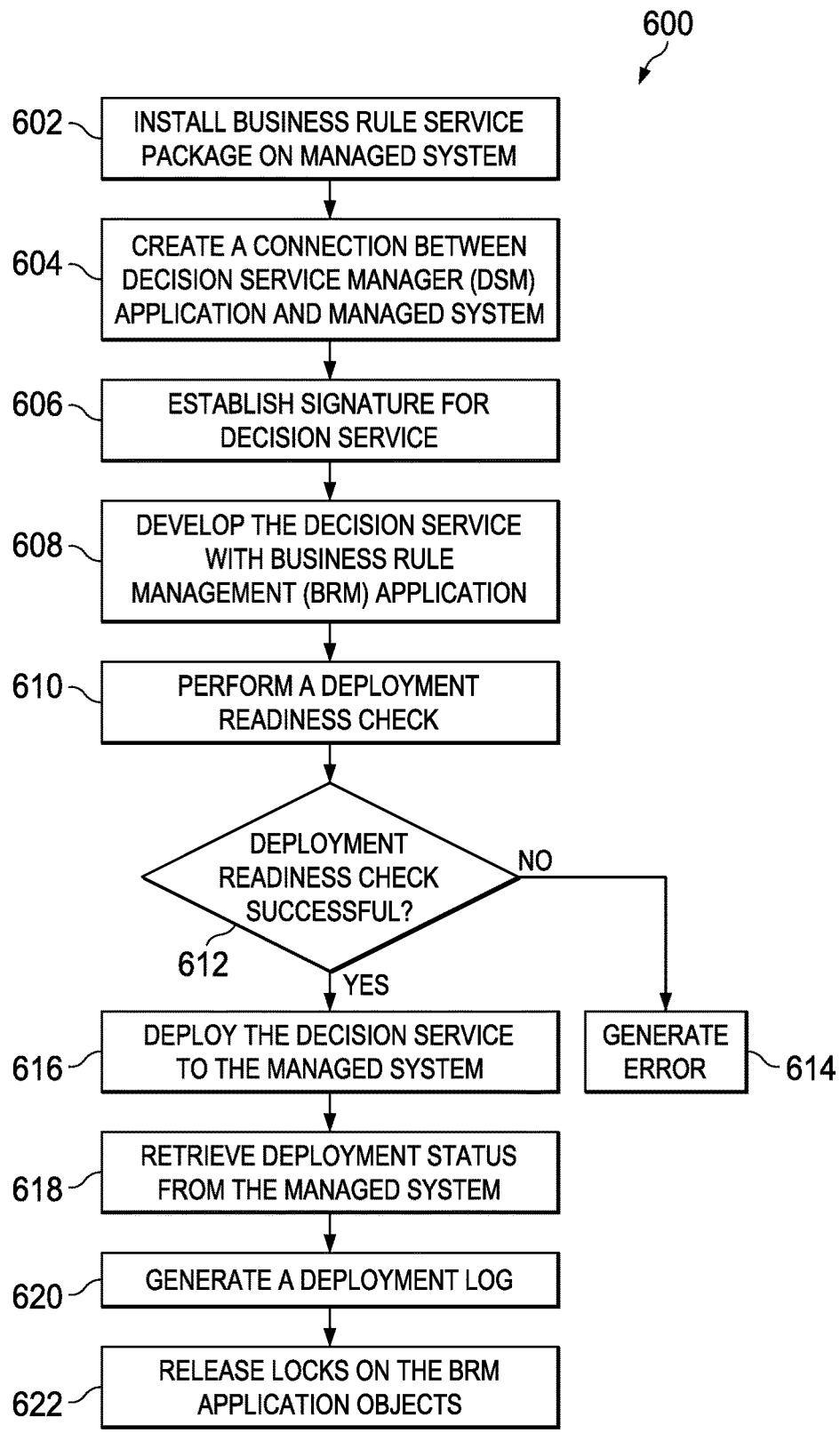
FIG. 6 is a flow chart for modeling of a decision service and preparation for deployment to a managed system.

Turning now to FIG. 6, FIG. 6 is a flow chart 600 for modeling a decision service and preparation for deployment to a managed system. For clarity of presentation, the description that follows generally describes method 600 in the context of FIGS. 1, 2, 4, and 5. However, it will be understood that method 600 may be performed, for example, by any other suitable system, environment, software, and hardware, or a combination of systems, environments, software, and hardware as appropriate. For example, one or more of the business suite server, the client, or other computing device (not illustrated) can be used to execute method 600 and obtain any data from the memory of the client, the business suite server, or the other computing device (not illustrated).

At 602, a business rule service package is installed on a system to convert the system to a managed system. From 602, method 600 proceeds to 604

At 604, a connection is created between the decision service manager (DSM) application and the managed system. In some implementations, a DSM application user will enter unique identification information into the DSM application GUI and select the entered managed system to establish the connection. From 604, method 600 proceeds to 606.

At 606, a signature for a decision service is established in the BRM application. The BRM application user may either retrieve the signature of an existing decision service on the DSM server or the managed system. If the decision service signature is retrieved from the managed system, in some implementations, the managed system returns XML defining the signature to the DSM application for use by the BRM application. The BRM application user may also define a new signature for a decision service using the BRM application. From 606, method 600 proceeds to 608.

At 608, a decision service is generated with the BRM application using the established decision service interface. The BRM application user may also use actual data from the managed system in order to develop, edit, and/or test the newly generated decision service. From 608, method 600 proceeds to 610.

At 610, a deployment readiness check is performed. Note, a deployment may be performed either online or offline. An online deployment refers to user interaction where the user starts the deployment and waits for a returned status message/result. An offline deployment refers to the user starting the deployment and revisiting the DSM application at a later time to determine the status of the deployment. A decision service can be deployed into a managed system when at least 1) the definition and implementation of the decision service is free of any error messages; and 2) concepts defined as limitations are not used within the decision service. For example, a defined limitation may include that action types or custom expression types are not supported in a decision service to be deployed to a managed system. Additional checks performed may include availability of the managed system (e.g., using RFC Ping), that all relevant packages have been generated by the BRM application, and that the managed system response with an acknowledgment that a deployment is OK. From 610, method 600 proceeds to 612.

At 612, a determination is made whether the performed readiness check returned a successful result. If at 612, it is determined that the performed readiness check did not return a successful result, method 600 proceeds to 614 where an error is generated. In some implementations, the error can be displayed on a GUI. In other implementations the error can also be transmitted using email or some other messaging method to a designated user and/or system to be further processed. If at 612, however, it is determined that that the performed readiness check did return a successful result, method 600 proceeds to 616.

Figure 7:
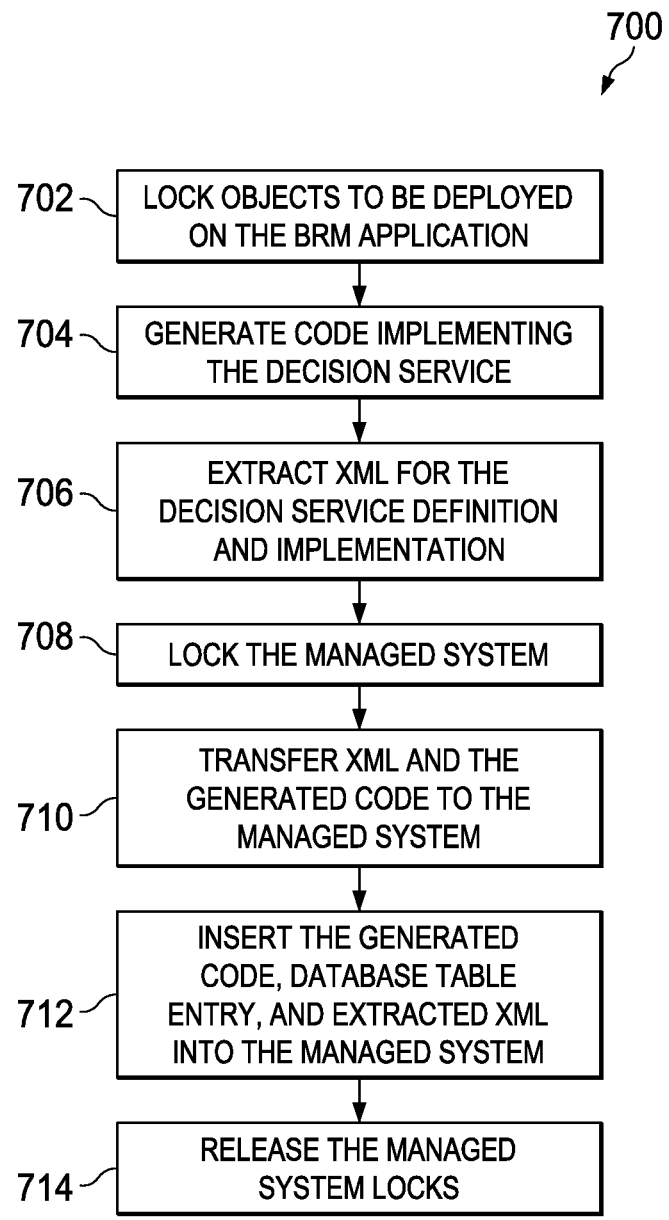
FIG. 7 is a flow chart for deploying a modeled decision service to a managed system.

At 616, the generated decision service is deployed on the managed system using the DSM application (further illustrated in FIG. 7). From 616, method 600 proceeds to 618.

At 618, the deployment status is retrieved by the DSM application from the managed system. From 618, method 600 proceeds to 620.

At 620, a deployment log is generated. From 620, method 600 proceeds to 622.

At 622, the locks on the BRM application objects are released. After 622, method 600 stops.

Although FIG. 6 illustrates the interaction between a single decision service manager (DSM) server and/or DSM application and a single managed system, it is possible for a DSM server and/or application to interface with multiple managed systems to, for example, request data from the multiple managed systems during a design-time modeling of a decision service. A single DSM application may also, for example, deploy (as further described in FIG. 7 below) a developed decision service to multiple managed systems. Similarly, multiple DSM applications may interface with a single managed system. Each DSM application import the XML descriptions of all deployed managed-system-specific decision services and may assist in the maintenance of the imported decision services on the managed system.

Further, in some implementations, a decision service may be in use by a managed system while an updated version of the decision service in use is deployed to the same managed system(s). In these implementations, the deployed updated decision service can have an as-of date/time parameter established. After the established as-of date/time has passed, any request to use the decision service will result in the use of the updated decision service. In other implementations, the newly deployed decision service may begin to be used immediately following successful deployment. The ability to deploy a new/updated decision service concurrently while another is in use avoids system downtime to perform decision service deployments and/or updates.

Turning now to FIG. 7, FIG. 7 is a flow chart for deploying a modeled decision service to a managed system. For clarity of presentation, the description that follows generally describes method 700 in the context of FIGS. 1, 2, 4, 5, and 6. However, it will be understood that method 700 may be performed, for example, by any other suitable system, environment, software, and hardware, or a combination of systems, environments, software, and hardware as appropriate. For example, one or more of the business suite server, the client, or other computing device (not illustrated) can be used to execute method 700 and obtain any data from the memory of the client, the business suite server, or the other computing device (not illustrated).

At 702, objects associated with the decision service on the BRM application are locked to prevent conflicts/modifications during deployment. In some implementations, all objects associated with the decision service are locked. In other implementations, a subset of the related objects is locked. From 702, method 700 proceeds to 704.

At 704, code is generated implementing the decision service. The generated code may be fully or partially written or described in any appropriate computer language including C, C++, Objective C, Java, Visual Basic, assembler, Perl, any suitable version of 4GL, as well as others. From 704, method 700 proceeds to 706.

At 706, an XML definition/implementation of the generated decision service is extracted from the generated code. From 706, method 700 proceeds to 708.

At 708, the managed system is locked to prevent conflicts/modifications during deployment. From 708, method 700 proceeds to 710.

At 710, the generated code and extracted XML are transferred to the locked managed system. From 710, method 700 proceeds to 712.

At 712, the transferred generated code and extracted XML is inserted into the managed system as a decision service and the decision service catalog is updated to reflect the inserted decision service. From 712, method 700 proceeds to 714.

At 714, the managed system locks are released. After 714, method 700 stops.

As used in the present disclosure, the term "computer" is intended to encompass any suitable processing device. For example, although FIG. 1 illustrates a single DSM server 102, client 140, and managed system 160, example distributed computing system 100 can be implemented using two or more DSM servers 102, clients 140, and managed systems 160. The example distributed computing system 100 can also be implemented with computers other than servers. For example, although FIG. 1 illustrates DSM server 102 as a server, the DSM server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, computers in example distributed computing system 100 may be adapted to execute any operating system, including Linux, UNIX, Windows, Mac OS, Java, Android, iOS or any other suitable operating system.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component within or interfacing with the example distributed computing system 100 may be fully or partially written or described in any appropriate computer language including C, C++, Objective C, Java, Visual Basic, assembler, Perl, any suitable version of 4GL, as well as others. While portions of the software illustrated in the various figures are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The preceding figures and accompanying description illustrate example processes and computer implementable techniques. But example distributed computing system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, the example distributed computing system 100 may use processes with additional steps, fewer steps, and/or different steps, so long as the methods remain appropriate. Process steps may also be executed and described software/services may also execute on various components of the example distributed computing system 100 so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method, comprising:
creating a connection between a decision service manager and a managed system;
establishing a signature of a decision service;
developing, using at least one computer, the decision service based upon the established signature of the decision service;
performing a deployment readiness check;
transferring generated code implementing the decision service to the managed system upon a determination that the deployment readiness check was successful; and
inserting the generated code into the managed system, wherein the inserting takes place while another decision service is in use.

2. The computer-implemented method of claim 1, further comprising installing a business rule service package on the managed system.

3. The computer-implemented method of claim 1, wherein the deployment readiness check is based upon criteria associated with the managed system and the developed decision service, the criteria including at least one of: that the definition and implementation of the decision service is free of any error messages, that defined limitations are not used within the decision service, the availability of the managed system, or that the managed system responds with an acknowledgement prior to performing the deployment.

4. The computer-implemented method of claim 1, further comprising locking objects associated with the decision service and locking the managed system.

5. The computer-implemented method of claim 1, wherein the inserted generated code has an as-of date indicating when the inserted generated code is permitted to execute on the managed system.

6. The computer-implemented method of claim 4, further comprising releasing the locks from objects associated with the decision service and the managed system.

7. A computer-program product, the computer program product comprising computer-readable instructions embodied on tangible, non-transitory media, the instructions operable when executed to perform operations to:

create a connection between a decision service manager and a managed system;

establish a signature of a decision service;

develop, using at least one computer, the decision service based upon the established signature of the decision service;

perform a deployment readiness check;

transfer generated code implementing the decision service to the managed system upon a determination that the deployment readiness check was successful; and insert the generated code into the managed system, wherein the inserting takes place while another decision service is in use.

8. The computer-program product of claim 7, further comprising operations operable to install a business rule service package on the managed system.

9. The computer-program product of claim 7, wherein the deployment readiness check is based upon criteria associated with the managed system and the developed decision service, the criteria including at least one of: that the definition and implementation of the decision service is free of any error messages, that defined limitations are not used within the decision service, the availability of the managed system, or that the managed system responds with an acknowledgement prior to performing the deployment.

10. The computer-program product of claim 7, further comprising operations operable to lock objects associated with the decision service and locking the managed system.

11. The computer-program product of claim 7, wherein the inserted generated code has an as-of date indicating when the inserted generated code is permitted to execute on the managed system.

12. The computer-program product of claim 10, further comprising operations operable to release the locks from objects associated with the decision service and the managed system.

13. A system, comprising:

memory operable to store at least one decision service; and at least one hardware processor interoperably coupled to the memory and operable to:

create a connection between a decision service manager and a managed system;

establish a signature of a decision service;

develop, using at least one computer, the decision service based upon the established signature of the decision service;

perform a deployment readiness check;

transfer generated code implementing the decision service to the managed system upon a determination that the deployment readiness check was successful; and insert the generated code into the managed system, wherein the inserting takes place while another decision service is in use.

14. The system of claim 13, further operable to install a business rule service package on the managed system.

15. The system of claim 13, wherein the deployment readiness check is based upon criteria associated with the managed system and the developed decision service, the criteria including at least one of: that the definition and implementation of the decision service is free of any error messages, that defined limitations are not used within the decision service, the availability of the managed system, or that the managed system responds with an acknowledgement prior to performing the deployment.

16. The system of claim 13, further operable to lock objects associated with the decision service and locking the managed system.

17. The system of claim 13, wherein the inserted generated code has an as-of date indicating when the inserted generated code is permitted to execute on the managed system.

18. The system of claim 16, further operable to release the locks from objects associated with the decision service and the managed system.

* * * * *